Oct. 30, 1923.

J. T. McNAIER 1,472,080

CENTRIFUGAL MACHINE GUN AND METHOD OF FEEDING SAME

Filed April 2, 1919      6 Sheets-Sheet 1

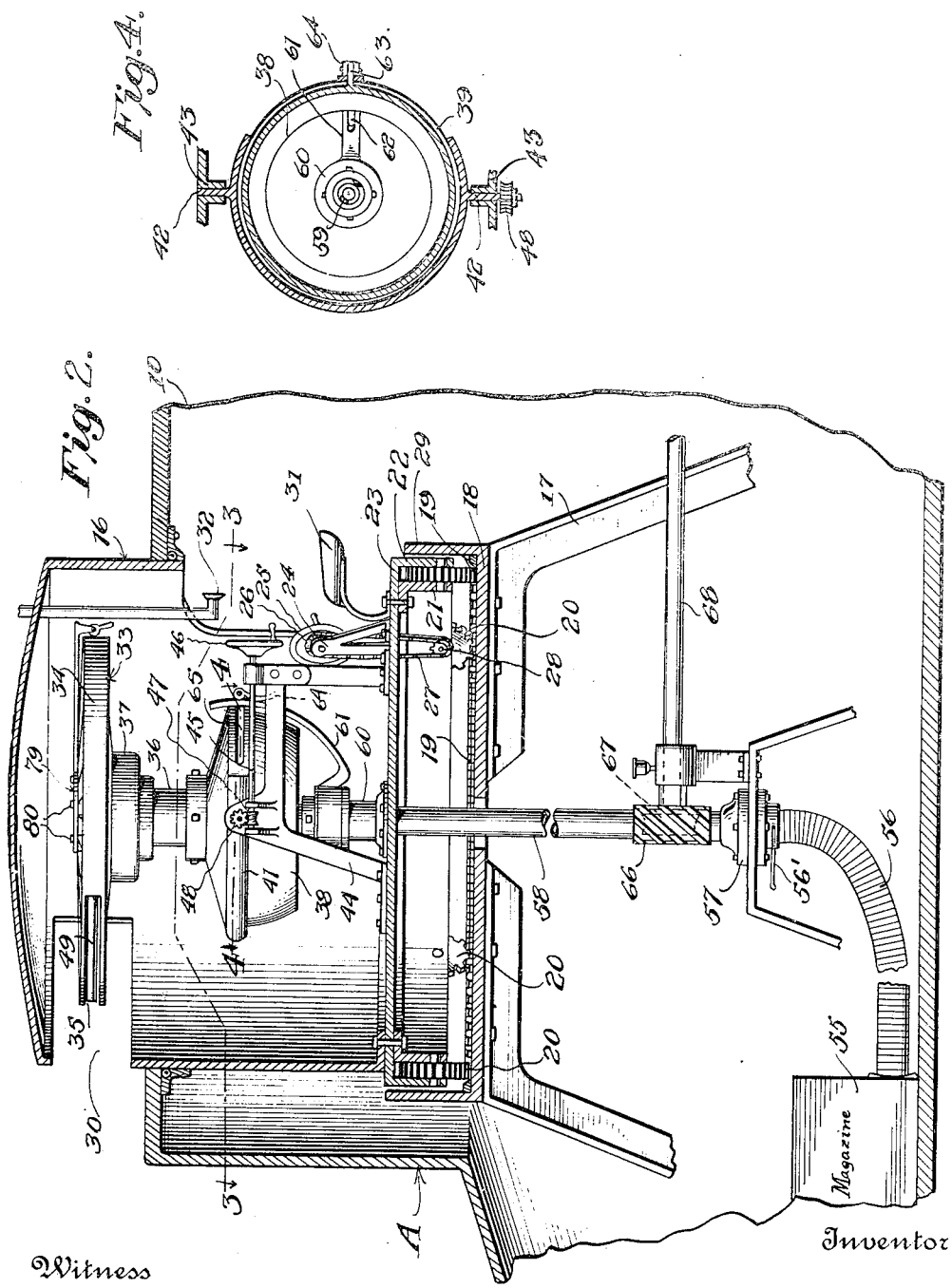

Oct. 30, 1923.
J. T. McNAIER
1,472,080
CENTRIFUGAL MACHINE GUN AND METHOD OF FEEDING SAME
Filed April 2, 1919  6 Sheets-Sheet 3
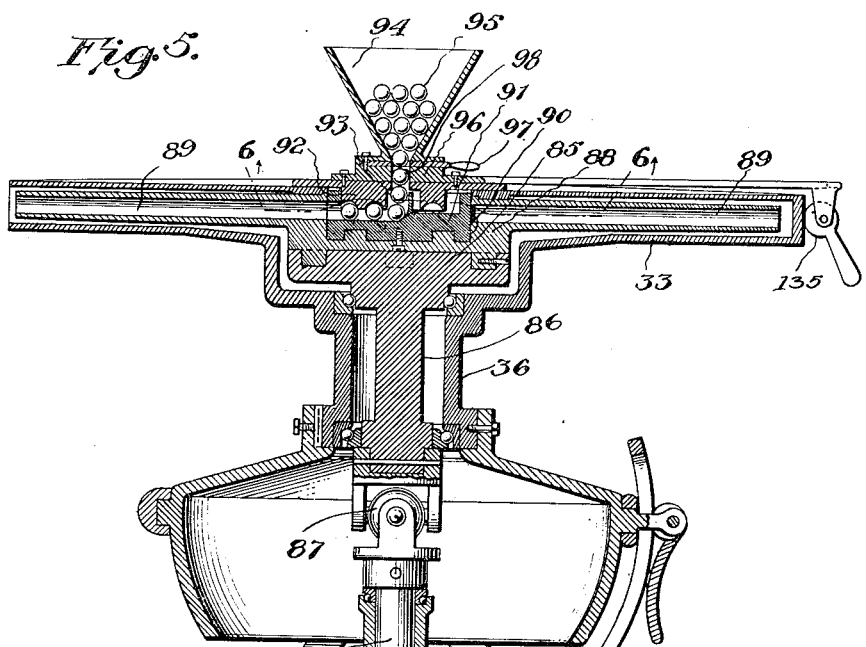
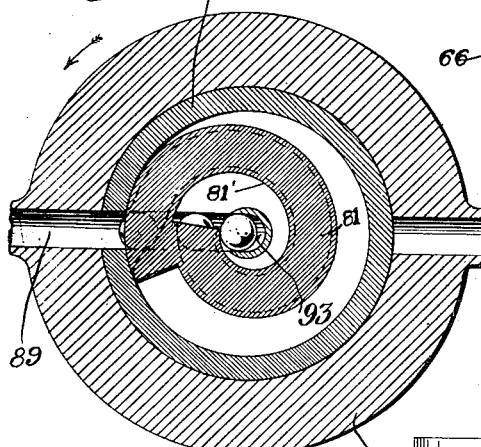
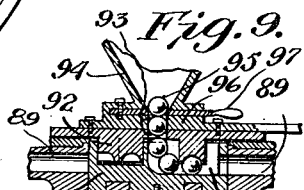
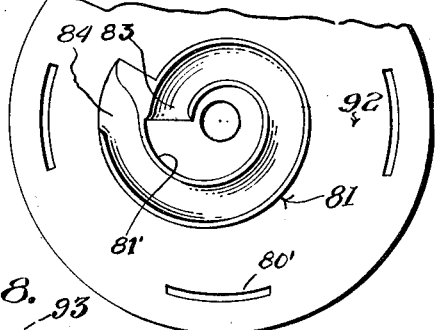
Inventor
Joseph Treanor McNaier Oct. 30, 1923.                                          1,472,080
J. T. McNAIER
CENTRIFUGAL MACHINE GUN AND METHOD OF FEEDING SAME
Filed April 2, 1919                    6 Sheets-Sheet 4
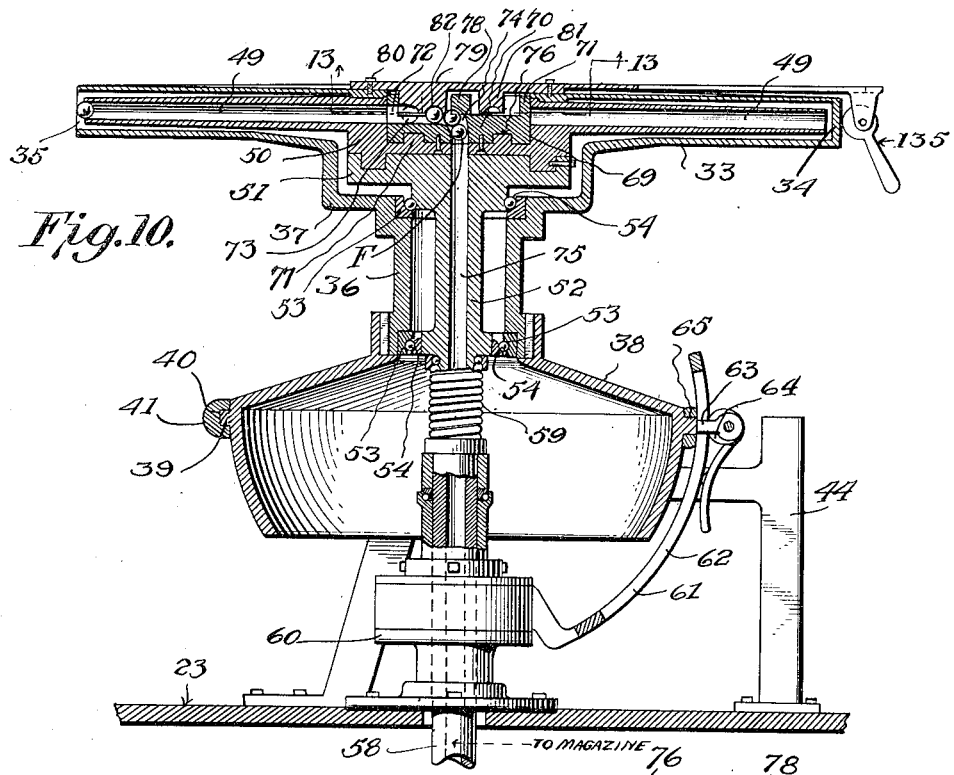
Fig. 10.
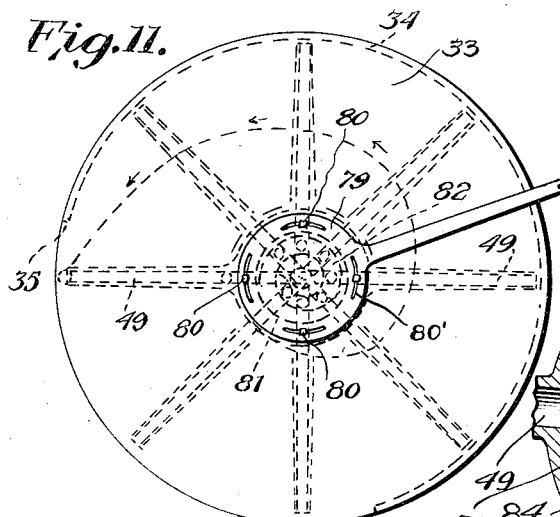
Fig. 11.
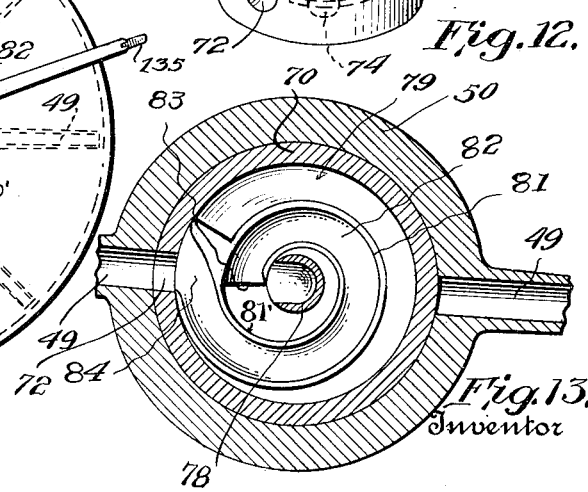
Fig. 12.
Fig. 13.
Witness
Inventor
Joseph Treanor McNaier Oct. 30, 1923.
J. T. McNAIER
1,472,080
CENTRIFUGAL MACHINE GUN AND METHOD OF FEEDING SAME
Filed April 2, 1919
6 Sheets-Sheet 5
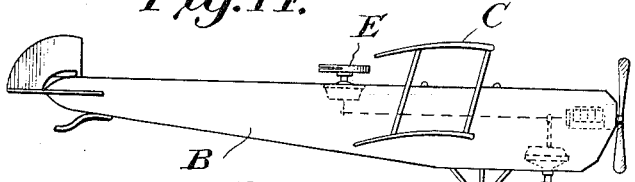
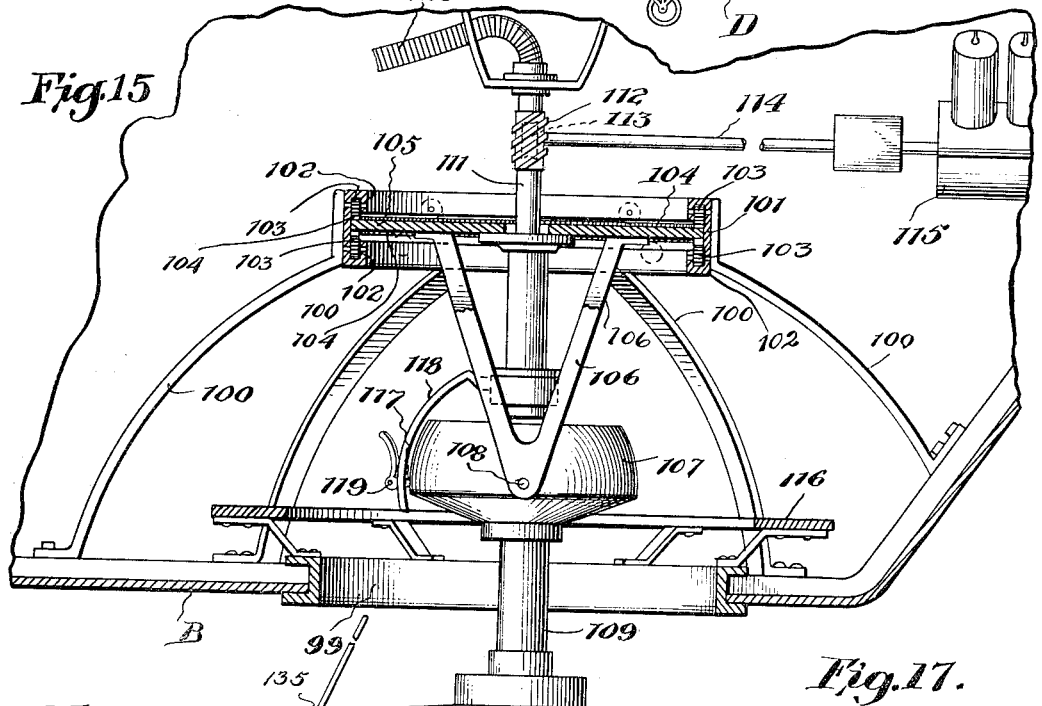
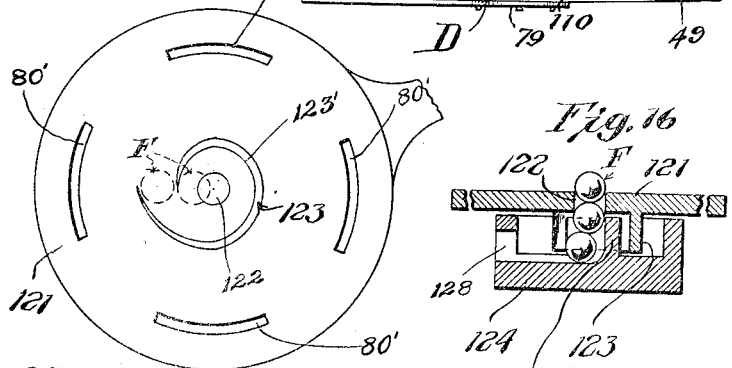
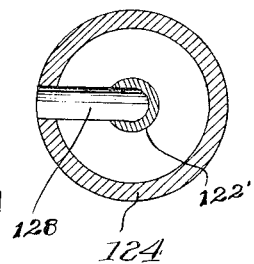
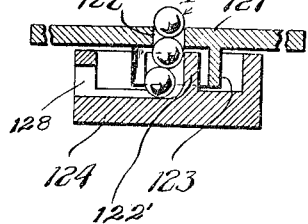
Inventor
Joseph Treanor McNaier
Witness Oct. 30, 1923.

J. T. McNAIER 1,472,080

CENTRIFUGAL MACHINE GUN AND METHOD OF FEEDING SAME

Filed April 2, 1919          6 Sheets-Sheet 6

Witness

Inventor
Joseph Treanor McNaier

Patented Oct. 30, 1923.

1,472,080

UNITED STATES PATENT OFFICE.

JOSEPH TREANOR McNAIER, OF NEW YORK, N. Y.

CENTRIFUGAL MACHINE GUN AND METHOD OF FEEDING SAME.

Application filed April 2, 1919. Serial No. 286,845.

*To all whom it may concern:*

Be it known that I, JOSEPH TREANOR MCNAIER, a citizen of the United States, residing in the city, county, and State of New York, have invented certain new and useful Improvements in Centrifugal Machine Guns and Methods of Feeding Same, of which the following is a specification.

The invention relates to an automatic gun and more particularly to the class of centrifugal guns, adaptable for use on armored motor trucks or the like, aeroplanes, tanks, fortifications or other places, for offensive or defensive warfare to resist enemy invasion or occupation.

The primary object of the invention is the provision of a gun of this character, wherein ammunition either explosive or non-explosive projectiles, such as balls, or other spherical objects are impelled in successive order singly therefrom at high velocity to assure the required force for long or short range shooting with maximum penetrating quality to make the gun effective in warfare.

Another object of the invention is the provision of a gun of this character, wherein the projectiles are discharged under centrifugal action with assured accuracy in aim and at variable distances for long or short distance fire without requiring the use of impelling or explosive charges for effecting the discharge and force of travel to the projectiles.

A further object of the invention is the provision of a gun of this character, wherein the projectiles will be positively and uniformly fed to the breech end of the barrel or barrels of said gun, without possibility of any choking or jamming action, or the breaking of the case of the latter nor will said case or other adjunct parts be subjected to undue strain which would result in rendering the gun ineffective or unfit for constant use or accuracy in firing, the gun being readily adjustable in a novel manner to vary the direction of projecting the projectiles during the shooting operation.

A still further object of the invention is the provision of a gun of this character wherein the feed of ammunition can be had either from above or below and such ammunition is delivered directly into the breech end of the barrel or barrels without impeding the advancement of the ammunition from the feed mechanism to the breech end of the barrel, the ammunition being successively delivered from the center of the case of the gun into the breech end of its barrel and by centrifugal force is discharged from said barrel with maximum velocity.

A still further object of the invention is the provision of a gun of this character wherein the case thereof is of novel form so as to avoid any possibility of fracture or mutilation during the feeding operation of the ammunition to the barrel or barrels of said gun.

Other objects will be in part obvious and in part hereinafter pointed out.

The invention accordingly consists in certain principles of construction and arrangement of elements, the construction of which will be hereinafter fully exemplified and the scope of the application of which will be indicated in the claims.

In the accompanying drawings:

Figure 2 is an enlarged fragmentary vertical longitudinal sectional view through the armored body of the truck and turret showing the centrifugal gun in side elevation;

Figure 4 is a sectional view on the line 4—4 of Figure 2 looking in the direction of the arrows;

(Figures 5 to 9 inclusive relate to a modified form of centrifugal gun.)

Figure 5 is an enlarged fragmentary vertical sectional elevation showing a modified form of centrifugal gun, the ammunition being fed thereto at the top of the gun in contradistinction to the bottom feed shown in Figure 2;

Figure 6 is an enlarged horizontal sectional view through the breech ends of the barrels of the gun and the case thereof showing in detail the snail or circuitous course of feed for the ammunition: (said view has been taken approximately on the line 6—6 of Figure 5 looking in the direction of the arrows;)

Figure 1:
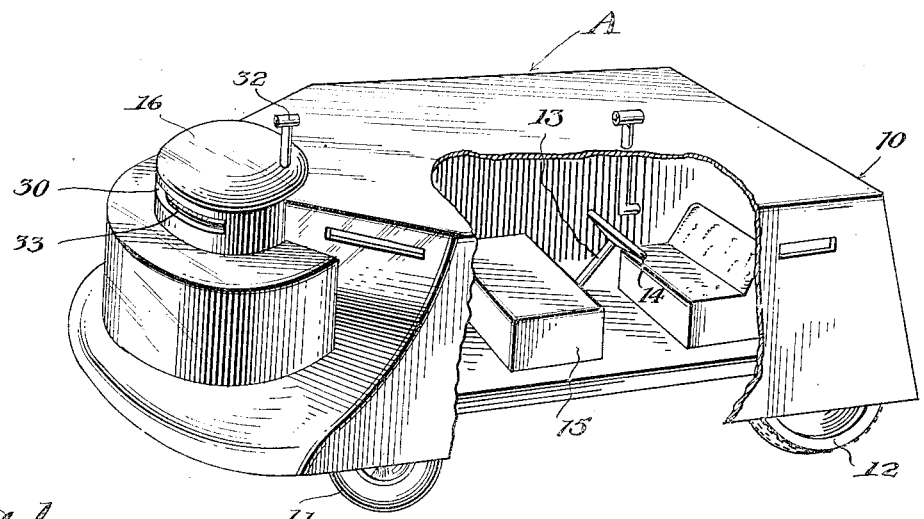
Figure 1 is a perspective view of an armored motor truck showing a fore or front turret with the centrifugal gun constructed in accordance with the invention interiorly of the latter.
Figure 3:
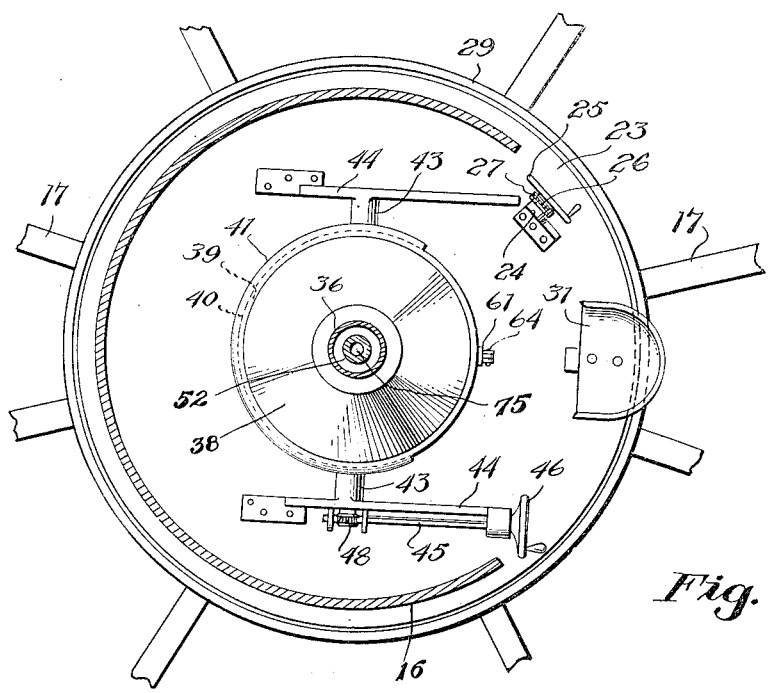
Figure 3 is a horizontal sectional view taken approximately on the line 3—3 of Figure 2 looking in the direction of the arrows.
Figure 19:
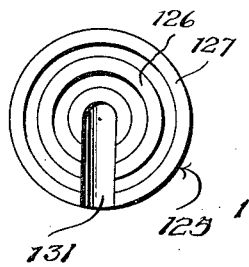
Figure 20:
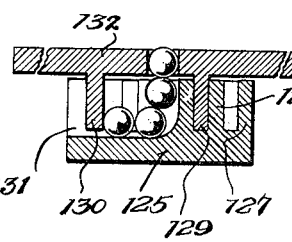
Figure 21:
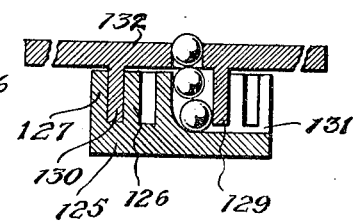
Figure 22:
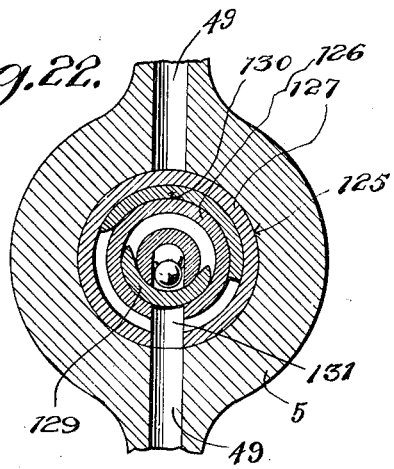
Figure 23:
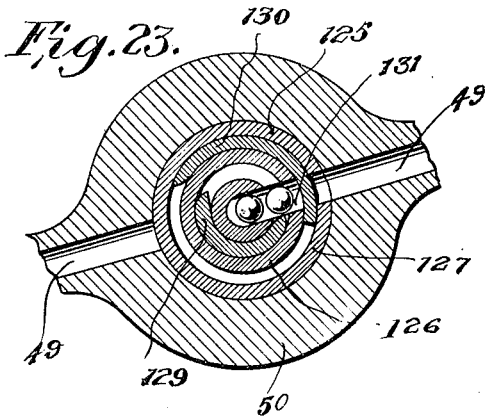
Figure 24:
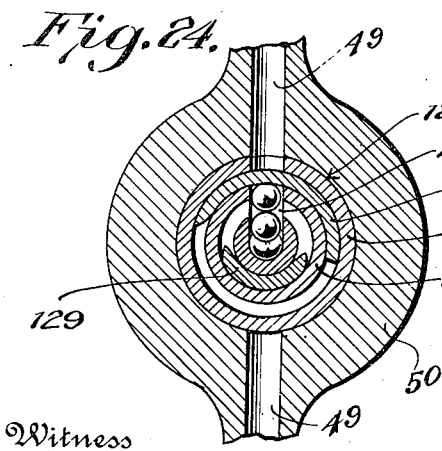
Figure 25:
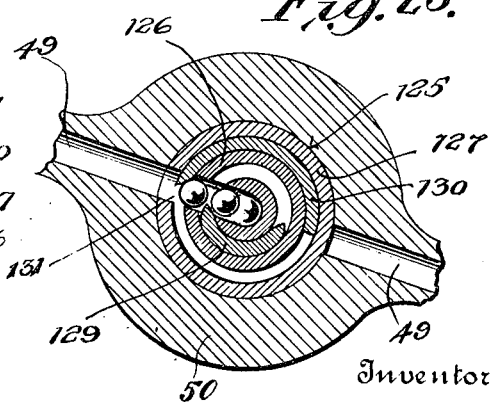

Figure 7 is a fragmentary plan view looking toward the under side of the feed disk;

Figure 8 is an elevation of the breech cup of the gun;

Figure 9 is a vertical sectional detail view of the construction shown in Figure 5 disclosing the initial advancement of a single ball in the feed mechanism;

Figure 10 is a fragmentary vertical sectional elevation showing in detail the construction of the centrifugal gun illustrated in Figure 2;

Figure 11 is a plane view showing in full lines the case of the gun and by dotted lines the different positions of the barrels in the rotative advancement thereof and the course of the ammunition under the centrifugal action from the point of feed centrally to the point of discharge peripherally;

Figure 12 is a perspective view of the breech or feed cup;

Figure 13 is a fragmentary sectional view on the line 13—13 of Figure 10 looking in the direction of the arrow;

Figure 14 is a side elevation of an aeroplane showing centrifugal guns constructed in accordance with my invention arranged fore and aft of the planes and respectively below and above the fuselage;

Figure 15 is an enlarged fragmentary vertical sectional view through the fuselage showing the lower centrifugal gun at the fore part of the aeroplane and illustrating a further modification of said gun;

Figure 16 is a fragmentary vertical sectional view showing in detail a further modified form of feed cup and cooperating disk and the feed course of the ammunition to the breech end of the gun;

Figure 17 is a plan view of a modified form of feed cup; shown in Figure 16;

Figure 18 is a plan view looking toward the under side of the feed plate or disk cooperating with the feed cup; shown in Figures 16 and 17;

Figure 19 is a detail plane view of a further modified form of feed cup;

Figure 20 is a fragmentary vertical sectional elevation through the feed plate and cup showing the relative positions of the control webs or gates;

Figure 21 is a view similar to Figure 20 showing another position of the webs or gates, after the barrel of the gun has rotated 180 degrees;

Figures 22, 23, 24 and 25 show respectively horizontal sectional views disclosing in detail the different positions of the feed webs or gates during the successive rotative movements of the breech of the gun.

Similar reference characters indicate corresponding parts throughout the several views in the dawings.

Referring to the drawings in detail, particularly Figures 1 to 4, and 10 to 13 inclusive, A designates generally an armored motor truck having a hollow body 10 supported upon front guide wheels 11 and rear traction wheels 12, the guide wheels being turned through the instrumentality of steering mechanism including a steering post 13 having a hand wheel 14 of the usual well known construction while motion is imparted to the traction wheels 12 through the medium of connections with a motor 15 either of the electric or gasoline type, although any approved motor power may be employed. The motor 15 together with the steering column 13 and its hand wheel 14 are located interiorly of the body 10, the latter being adapted at its fore or front end to accommodate a front turret 16 in which is arranged my centrifugal gun hereinafter fully described.

Interiorly of the body 10 of the armored motor truck at the point of the turret 16 is arranged a stand including supporting legs 17 which are suitably fixed to the bed of the body 10 and converge upwardly therefrom for sustaining a circular platform 18, the same being bolted or otherwise fastened to the legs. On the upper face of this platform near the periphery thereof are formed teeth 19 with which mesh traction cog wheels 20 suitably journaled at intervals between inner and outer hanger flanges 21 and 22 respectively depending from the turn table 23 of the turret 16 and in this manner the said turret is rotatably supported at the fore or front of the armored motor truck. Rising from the turn table 23 near the peripheral edge is a standard 24 forming a bearing for a hand turning wheel 25 having a sprocket gear 26 over which is trained an endless sprocket chain 27, the same being also trained over a sprocket wheel 28 fixed to the journal of one of the cog wheels 20 so that the said latter wheel can be manually rotated for the turning of the turret as the occasion may require.

Formed at the peripheral edge of the platform 18 is an upstanding rim 29 serving as a guard for the turn table 23 of the turret 16 and also for the cog wheels 20, the latter being designed to constitute the traction wheels for the turret.

The cylindrical or circular wall of the turret near the head thereof for a distance circumferentially is cut away to provide an opening or window 30 for the sighting and the discharge of the centrifugal gun, the construction of which will be hereinafter fully described.

Located upon the turn table 23 adjacent to the standard 24 is a seat 31 to be occupied by the gunner and convenient to said gunner is a periscope 32 which extends upwardly through the head or roof of the turret, the periscope being of any approved form and is used for sighting purposes.

The centrifugal gun comprises a circular casing 33 closed peripherally throughout the major portion thereof as at 34 thus leaving a minor opening 35 at the periphery of the casing, the central portion of the casing 33 at the under side thereof being formed with a column or pedestal 36 which is enlarged as at 37 in a step by step manner and the larger portion thereof joins the casing 33 with the column 36. Fixed to the column 36 at its lower end is a rotative pendulum bowl 38 open at its bottom and formed with an external rib 39 fitted within a companion channel or groove 40 formed in a gimbal ring 41 provided at diametrically opposite points with trunnions 42 journaled in bearings 43 formed in stationary supporting frames 44 mounted on and rising from the turn table 23. One of the frames 44 is fitted with an adjusting shaft 45 having a hand wheel 46 in convenient reach of the gunner when occupying the seat 31, the shaft 45 being provided with a worm screw 47 meshing with a worm gear 48 fixed to one of the trunnions 42 of the gimbal ring 41, the said trunnions being designed as pivots therefor to permit the rocking of the ring in the frames 44 to allow angular adjustment of the centrifugal gun within the turret 16 when sighting said gun in the use thereof.

Arranged within the casing 33 are directly opposite gun barrels 49 extending outwardly radially from the center breech portion 50 detachably interfitted with a rotating hub 51 formed at the upper end of a hollow shaft 52 arranged within the column or pedestal 36 and held centrally for free rotation therein through the medium of ball cones 53 and bearing balls 54 respectively which are fitted within said column or pedestal 36 in any suitable manner, the hub 51 being located within the enlargement 37 of the column or pedestal 36.

Within the body 10 of the truck at a convenient point beneath the platform 18 is a magazine 55 for containing ammunition such as balls or other equivalent spherical objects and leading from this magazine is a conveyor tube 56 which through a suitable coupling 57 has connection with a driven hollow shaft 58 extending upwardly through the platform 18 and turn table 23 centrally thereof, the shaft 58 at its upper end being connected with the shaft 52 through the medium of a bendable coiled or flexible spiral joint 59 which provides in the plane of the axis of the trunnions 42 a flexing point between said shafts 52 and 58 on the angular adjustment of the gun when the gimbal ring 41 is rocked in the frames 44. The hollow shafts 52 and 58 together with the bendable coiled or spiral joint 59 and the conveyor tube 56 with coupling 57 form a passage or bore for the travel of the ammunition from the magazine 55 to the feed mechanism of the breech of the gun for delivering the ammunition from said magazine to the breech end of the active barrel of the gun in a manner presently described. Conveyor tube 56 is provided with cut-off 56' intersecting passage in said tube.

Surrounding the shaft 58 at the point of intersection thereof through the turn table 33 of the turret 16 is a stand 60 constituting a bearing for the rotatable mounting of a bracket arm 61 having an elongated slot 62 through which projects an extension 63 formed on the rib 39 working in the gimbal ring 41 and this extension 63 carries a cam latch 64 to act upon the arm 61 so as to lock the bowl 38 in adjusted position and also to hold the gimbal ring 41 against rocking movement after adjustment thereof. The gimbal ring 41 circumferentially for a distance thereof is provided with a slot 65 for the extension 63 so that the bowl 38 can be rotated a limited distance within the gimbal ring 41 in the sighting or aiming of the gun to assure accuracy on the firing thereof.

The shaft 58 is formed with a worm screw 66 with which meshes a worm gear 67 carried on and fixed to the power shaft 68 of the motor 15 so that said shaft 58 will be driven directly from the motor, or suitable gearing on other devices may be interposed between shaft 68 and motor 15.

The breech portion 50 has forced centrally therein a counter seat 69 in which is fitted a feed or breech cup 70 having in its vertical annular wall 71 an opening 72 which alines axially with the bore of the active barrel 49, the opening 72 registering with a radial groove 73 formed in and opening through the upper face of the bottom of the cup 70 and terminates at the center thereof where it merges into an opening 74 in axial alinement with the passage 75 in the hollow shaft 52, the cup 70 being removably fitted within the counter seat 69 and is held fixed and interlocked in the center portion 50 through the medium of companion apertures 76 and lugs 77 formed in the cup 70 and on the center portion 50 respectively. Concentric of the inner end of the groove 73 at the point of merger thereof with the center opening 74 in the cup 70 and rising from the bottom of said cup is an inner semi-circular shaped web or gate 78 constituting a deflector for the ammunition supplied from the passage 75 to the feed mechanism hereinafter fully described.

The upper part of the feed mechanism for the breech portion 50 and cooperating with the cup 70 comprises a disk or circular plate 79 which bridges the upper open end or top of said cup 70 and is adjustably fastened to the top of the casing 33, in this instance the said disk or plate 79 being detachably and adjustably secured through the medium of bolts 80 and slots 80'. However, it is to be distinctly understood that the disk or plate 79 can be mounted in any suitable manner so that it may be manually adjusted to vary the point of discharge of the ammunition to the breech end of the active barrel 49 of the gun, and thus control the direction of said ammunition.

The plate or disk 79 has formed on its under or inner face a convolute or spiral continuous rib or web 81 which is formed with a feed groove or channel 82 the trend of which corresponds to the convolute rib or web 81 and is of substantially semi-circular shape in cross section, the groove or channel opening through the face of the rib or web and its inner end constituting an entrance 83 for the amunition delivered into the cup 70 while the outer end 84 is curved laterally to provide a discharge mouth for the delivery of the amunition to the breech end of the active barrel 49 of the gun.

The feed groove or channel 82 being of convolute form and corresponding in cross-section to the radial groove 73, provides in conjunction with each complete revolution of the gun barrel a simple and positive means for singly and successively engaging the balls F as they emerge from the passage 75 to be deflected by deflector 78 into the beginning of the said radial groove 73. The ball which is thus engaged singly by the groove 82, say at the beginning of a revolution, will be found to travel outwardly and radially from the center in and along the radial groove 73, and meanwhile the immediately following ball in the passage 75 as well as all subsequent balls will be restrained until the completion of said revolution by means of the innermost wall 81' of the convolute web 81 but permitted nevertheless during said revolution to slightly and gradually advance along the said radial groove 73 to a distance corresponding to the pitch of said convolute inner edge.

At the completion of said revolution the ball previously mentioned as being engaged by the grooves 73 and 82 has also advanced outwardly along said groove 73 to a distance corresponding to the pitch of said convolute groove 82, when it is disengaged by said groove 82 and permitted under centrifugal action induced by the rotation of the gun barrels to enter the active gun barrel and to be subsequently expelled therefrom and projected towards the objective.

Simultaneous with the disengagement or release of the ball by the groove 82 at approximately the completion of the revolution, the immediately following ball which has been restrained by means of the wall 81' but which has nevertheless slightly advanced as above mentioned and described, is now in proper position in the radial groove 73 to be similarly singly engaged by the convolute groove 82 and forced to travel outwardly and radially along the radial groove 73 and to be similarly subsequently disengaged or released by said groove 82 and permitted under centrifugal action to enter the gun barrel and to be subsequently expelled therefrom and projected toward the objective similarly to the method mentioned and described for the first or preceding ball, and thus completing the cycle of operation.

Said cycle of operations, consisting of the engagement and release singly and successively of the balls F in the radial groove 73 by the groove 82 while in the meantime succeeding balls are restrained but nevertheless permitted to gradually and slightly advance as just described, continues concurrently and indefinitely in conjunction with the rotation of the gun barrels and as long as balls F are supplied to and emerge from passage 75 into said groove 73.

The upper feed disk 79 being adjustably attached to the casing 33, the disengagement and release of the balls by the groove 82 can be positively controlled and regulated so that the precise time of said disengagement or release with respect to the rotation of the gun barrel can be very exactly and accurately predetermined or varied at will by rotatably adjusting said disk 79, or by rotatably adjusting said casing 33, or by ratatably adjusting said disk and casing should that be desirable, with the result that the azimuth of the trajectory of the expelled balls at all times is under perfect and absolute adjustment, control and regulation.

In Figures 5, 6, 7, 8 and 9 of the drawings, there is shown a slight modification of my centrifugal gun, wherein the rotative hub 85 is a part of a solid shaft 86 which is rotatively mounted within the column 36 of the casing 33 of said gun correspondingly to the mounting of the hollow shaft 52 and at the lower end of said shaft 86 in the plane of the axis of the trunnions 42 is a universal joint 87 flexibly connecting it with the driven shaft 86' operating with the power shaft of the motor. The breech portion 88 having the directly opposed barrels 89 is detachably connected with the hub 85 in any suitable manner, the breech portion 88 being formed with a central counter seat 90 in which is seated the breech cup 91 which is of a construction corresponding to the cup 70 with the exception that it is formed with a non-perforated deflecting center in contradistinction to the center opening 74 in the cup 70 and deflector 78.

Cooperating with the cup 91 is a feed disk or circular plate 92 corresponding to the plate 79 excepting that the disk 92 is formed with a central opening 93 for the top feed of ammunition therethrough to the breech cup 91. Mounted upon the disk or plate 92 centrally thereof is an ammunition hopper 94 adapted to contain the ammunition such as balls 95 and the base 96 of said hopper is provided with a manually operated cutoff valve 97 intersecting the lead passage 98 from the hopper to the opening 93 in the disk or plate 92 and in this manner the feed of the ammunition from the hopper is controlled.

To alter or change the discharge of the ammunition from the active barrel of the gun to the inactive barrel in either the preferred or modified forms thereof, it is necessary to adjust the breech cups 70 and 91 respectively. That is to say, should it be desired to discontinue the use of a particular barrel and to utilize the other or idle barrel, it is necessary to change the position of the breech cup so as to register with the other barrel it being understood that only one barrel is employed at a time, although it would be entirely possible to employ two or more without departing from the spirit and principle of my invention.

If it is desired to change the point of discharge of the ammunition from the barrel selected for active duty, it is only necessary to rotatably adjust the feed plate or disk 79 on the top of the casing 33 of the gun, or by rotating said casing, or by rotating the turn table 23, or by rotatably adjusting one or more of said parts.

In Figures 14 and 15, there is shown a still further modification of my centrifugal gun, the construction of which is designed more particularly for use in aeroplanes or the like and the construction of said gun will be hereinafter fully described. With particular reference to Figure 14, there is shown a conventional form of aeroplane having in its fuselage B fore and aft of the planes C a lower centrifugal gun D and an upper centrifugal gun E which are inversely mounted or arranged with respect to each other in the fuselage. It is believed that a detail reference to the lower centrifugal gun D will suffice.

Referring to Figure 15 the fuselage B at its bottom is formed with a circular opening 99 while concentrically of said opening within the fuselage are brackets or legs 100 supporting an annular bracket 101 superposed relative to the base of said fuselage and in vertical axial alinement with the opening 99, the bracket 101 being formed with inwardly extending opposed flanges 102 at the top and bottom edges thereof in which are journaled cog gears 103 meshing with cog teeth 104 formed on opposite faces of a circular turn table 105 which is adapted to rotate within the annular bracket 101 for the turning of the centrifugal gun in the sighting thereof. Fixed to and depending from the turn table 105 are hangers 106 for the pivotal mounting of the hollow balancing bowl 107 which is provided at diametrically opposite points with trunnions 108 journaled in the hangers 106 and from the center of this bowl depends the column or pedestal 109 which projects through the opening 99 for a distance beneath the base or bottom of the fuselage B and carries at its projected end thereon the circular gun casing 110 in which are mounted the rotative gun barrels constructed correspondingly to the barrels 49 shown in Figure 10 of the drawings. In fact, the centrifugal gun in its detail construction as illustrated in Figure 15 corresponds to the detail construction illustrated in Figure 10 of the drawings. In this instance, however, the gimbal ring feature has been omitted, but may be included if deemed necessary or desirable. Cam latch 135 holds the feed disk in adjusted position.

The driven shaft 111 of the centrifugal gun in the mounting thereof shown in Figure 15 through the medium of the worm screw 112 and worm gear 113 has connection directly or through gears or otherwise with the power shaft 114 of an auxiliary gun motor or of the aeroplane motor 115 operating the propeller thereof.

Concentric of the opening 99 and elevated with respect to the bottom of the fuselage B is an annular platform 116 for use by the gunner or operator of the centrifugal gun. The bowl 107 at one point thereof exteriorly of the same is formed with an extension 117 which works through a slot in a rotatable guide arm 118 corresponding to the guide arm 61 and this extension is fitted with a pivotally mounted cam lock or latch 119 to fasten the bowl 107 in adjusted rocked position for regulating the angular disposition of the centrifugal gun in the aiming thereof for elevated or depressed firing.

The ammunition is supplied to the centrifugal gun from a suitable magazine interiorly of the fuselage and the feed of such ammunition is effected from said magazine in any suitable manner, yet due to the suction action in the bores in the barrels of the gun when the same is rotated at high speed, there is caused a drawing action upon the ammunition within the conveyor tube 120 leading from said magazine to the driven shaft 111 of the gun, while the feed mechanism will control the delivery of the ammunition from the breech of the gun to the active barrel thereof.

In Figures 16, 17 and 18 of the drawings there is shown a slight modification of the feed disk 79, said modification comprising a feed disk or plate 121 which is formed with a central entrance opening 122, while on the inner or under side of said plate eccentrically of the opening 122 is a distorted spiral web or flange 123 constituting the controlling gate for the delivery of the ammunition from the breech cup 124, which corresponds in construction to the breech cup 70 hereinbefore described, to the breech end of the active barrel of the gun.

The distorted continuous spiral web or flange 123 is of convolute form and provides in conjunction with each complete revolution of the gun barrel a simple and positive means for singly and successively engaging the balls F as they emerge from the passage 122 to be deflected by the deflector 122' into the beginning of the radial groove 128, the ball which is thus engaged singly by the web or flange 123, say at the beginning of a revolution will be forced to travel outwardly and radially due to centrifugal action, from the center in and along the radial groove 128, and meanwhile the immediately following ball in the passage 122, as well as all subsequent balls will be restrained until the completion of said revolution, since the first or preceding ball is restrained until the completion of said revolution by means of the innermost face 123' of the web or flange 123, but said subsequent balls will be permitted nevertheless to slightly, gradually and correspondingly advance along the said groove 128 to a distance corresponding to the pitch of said convolute inner edge 123'.

At the completion of said revolution the ball previously mentioned as being engaged coincidently by the flange or web 123 at its innermost face 123' and by the groove 128 has also correspondingly advanced outwardly along said groove 128, to a distance corresponding to the pitch of said convolute web or flange 123, when it is disengaged by the same and permitted under centrifugal action to enter the gun barrel and to be subsequently expelled therefrom and projected towards the objective.

Simultaneously with the disengagement of the ball by the web 123 at approximately the completion of the revolution the immediately following ball which has been restrained by the preceding ball but which has nevertheless gradually, slightly and correspondingly advanced as above mentioned and described is now in proper position in the groove 128 to be similarly singly engaged by the innermost edge 123' of the web or flange 123 and forced to travel outwardly along the groove 128 to be subsequently disengaged or released by said web or flange 123 and permitted under centrifugal action to enter the gun barrel and to be expelled therefrom and projected toward the objective similarly to the method mentioned and described for the preceding ball.

In Figures 19 to 25, there is shown a still further modification of the breech feed mechanism, wherein the breech cup 125 has formed therewith inner and outer concentrically arranged upstanding webs or flanges 126 and 127 respectively which are broken away at the point of intersection of a radial groove or channel 131 which extends from the center of the cup through the peripheral edge thereof and this groove or channel 131 is the delivery groove or channel to the breech end of the barrel of the gun and registers therewith while interfitted between the webs or flanges 126 and 127 are diametrically opposed reversely set semi-circular shaped gates 129 and 130 respectively formed on and depending from the under or inner face of the rotatively adjustable feed disk or plate 132 so that the balls delivered to the breech cup 125 will be controlled and singly and successively delivered through the groove or channel 131 from the center of the gun to the breech end of the active barrel thereof. In Figures 22 to 25 inclusive, the different steps of movement of the webs or flanges 126 and 127 and the manner of the control and release of the balls constituting the ammunition by the gates 129 and 130 are illustrated during the rotative movement of the gun during one complete revolution thereof.

From said Figures 22, 23, 24 and 25, it will be seen that when the gun barrel is rotated, the balls emerging from the axial passage 75 into the radial channel or groove 131 will, due to centrifugal force acting upon them, advance outwardly along said groove 131 until they meet and are engaged by the inner web 129 which for a circumferential distance of approximately 180 degrees blocks said channel 131 and therefore for that distance restrains the further outward advance of said balls. When the gun barrel has been rotated that distance, however, the web 129 ceases to block channel 131 and the balls will due to said centrifugal force make another and further advance outwardly along channel 131 for a distance approximately equivalent to the diameter of one ball when they will meet and be engaged by the outer web 130 which for a circumferential distance of approximately 180 degrees now blocks channel 131 and therefore for that distance now restrains the further outward advance of said balls. When, however, the gun barrel has been further rotated that distance and has thus approximately completed one revolution, the web 130 ceases, and the web 129 again as before commences, to block the channel or groove 131 with the result that only the first ball, that is to say the ball which was the first to directly meet and to be engaged and restrained by the web 130, is, at this precise moment and point in the rotation of the gun barrel, released from said engagement with and restraint of the web 130. Said ball now being unrestrained but nevertheless under the action of centrifugal force is now free to outwardly advance from the channel 131 and to enter the bore of the active gun barrel which registers with and is in radial alinement with said channel 131 and to then rotate within said bore and to be subsequently expelled therefrom by centrifugal force toward the objective.

Simultaneously with said release of the first ball from engagement with and restraint of said web 130 as above described in detail, the web 129 commences to block the channel 131 and while pushing the first ball outwardly, it, at the same time engages the immediately following ball, which is now in proper position in said channel 131, so that the said following ball as well as all those following subsequent thereto will be for the instant restrained in their further outward advance in channel 131. Said restraint continues as before mentioned during the rotation of the gun barrel for a circumferential distance or rotation of approximately 180 degrees when it ceases and the balls are released by the web 129 and permitted to similarly advance and then to be similarly engaged and restrained by the web 130 from which latter engagement and restraint, the ball directly next to said web 130 is similarly released and permitted to enter the bore of the gun barrel while the ball immediately following is simultaneously engaged and similarly restrained by the web 129, thus successively completing the cycle of the operation of feeding and advancing the balls singly, successively and continuously from the axis of rotation radially outwardly in a line at right angles to the said axis of rotation, and permitting said balls to escape singly and successively into the breech of the gun barrel and to then be expelled therefrom and be propelled by centrifugal force toward the objective.

It should be noted that the above described modified form of feed control together with its principle of operation, control and release is similar to that previously described; the distinction in this modification being that instead of a gradual advance secured with the convolute form of rib, web, or feed groove, the balls when released from the restraint of the innermost web or gate 129 are permitted to advance until restrained by the outermost web or gate 130, when the succeeding balls similarly are in turn successively restrained and released by said innermost gate 129 and outermost gate 130 respectively.

It is apparent that by reason of the particular construction of the feed mechanism of the centrifugal gun hereinbefore described, the ammunition such as balls F, and 95, are directly delivered into the breech cup in the breech portion in axial alinement with the bore of the active barrel of the gun so that there is no strain or stress upon the feed disk or plate nor is there possibility of any knocking, jamming or otherwise tearing or mutilating action when the gun is driven at high rotative speed for the centrifugal operation to effect the discharge of the ammunition in successive order singly from the active barrel of the gun.

The centrifugal gun in the particular mounting thereof can be readily and accurately adjusted and sighted either for elevated or depressed shooting. In the operation of the gun, the projectiles are discharged at high rotative speed as the balls in their travel through the bore of the active barrel will rotate as they advance outwardly through said bore due to the centrifugal action which also serves to discharge said projectiles from the barrel of the gun at high velocity with force commensurate with the speed of rotation of the gun.

The gun in the operation thereof is adaptable and useful for long or short range shooting as the velocity of the projectiles impelled therefrom is proportional to the rotative speed of the barrels and as the gun is fired without the use of explosives or other impelling charges with effectiveness, its location when in operation is not disclosed by either flash, noise or smoke.

The gun in the adjustment thereof can be accurately controlled, directed and aimed so that the projectiles discharged therefrom one by one will reach the mark or object, as accuracy of aim is possible and assured; the point of discharge of the projectiles from the gun being readily controlled on rotative adjustment of the feed mechanism, or on rotative adjustment of the casing or its support; or by increasing or decreasing the speed of rotation; or by a combination of one or more of the foregoing dependent upon the location of the objective.

While it is not desired to limit any particular means for feeding the projectiles into the breech cup and any suitable means may be used for this purpose, there is shown a conveyor pipe which directs the projectiles centrally into the breech cup. Said pipe may be located either above or below the plane of movement of the barrel, and may or may not be provided with a means of cut-off 56' intersecting the passage in said pipe.

In operation the projectiles are discharged into the breech cup from the conveyor pipe and inasmuch as the breech portion is rotating at a high speed the projectiles will be caused to travel, by reason of centrifugal force, in and along the radial groove in said cup radially therein registering with and in alinement the bore of the gun barrel, and are urged outwardly within the cup from the point of lesser peripheral speed to a point of greater peripheral speed by centrifugal force during which movement the projectiles will be positively acted upon and in contact with the feed surfaces of the feed plate, and thus under a positive movement the projectiles are radially and singly advanced. When the projectiles leave the feed surfaces, they are admitted into the breech end of the active barrel, and having been singly released from engagement with the feed disk which has restrained and controlled their outward advance along the radial groove of the feed cup, they are now free to be acted upon by the progressively increasing centrifugal force and to rotate within the bore of said barrel outwardly and be rapidly discharged and propelled therefrom. As but one ball or projectile can be thus released during each complete revolution of the barrel, there is no possibility of jamming or choking in either the breech cup or the barrel of the gun, and furthermore the ammunition will always leave the gun barrel at approximately the same point of the periphery of the circle described by the outer end of the rotating gun barrel.

It is of course to be understood that the rotatably mounted barrels might be disposed to rotate in a vertical plane as well as in a horizontal plane or in any other plane at an angle to the horizontal.

Although I have in this my preferred form of centrifugal machine gun and in my preferred and modified forms of feeding same shown and described in each instance two radially and diametrically disposed gun barrels rotatably mounted about an axial breech portion having an L shaped channel one part of which is coincident with the axis of rotation and the other part of which is in radial alinement with the bore of the active barrel of the gun I do not by this mean or intend to confine or limit myself to this precise arrangement, or to limit or confine myself to that precise number of gun barrels as obviously one gun barrel or three or more gun barrels may be used and employed if deemed to be desirable.

There has been illustrated mechanism which is believed to be entirely effective for the purpose intended, which has few parts, and which is very simple in its operation, yet it will be obvious that said mechanism may be modified to suit various conditions without departing from the spirit of the invention, therefore, it is to be understood that such changes and variations may be made as come properly within the spirit of my invention and the scope of the appended claims.

What is claimed is:

1. The combination of a radially disposed rotatable gun barrel and means for exerting continuous eccentric action upon and directly moving spherical projectiles in alignment with said barrel.

2. The combination of a radially disposed gun barrel adapted to be rotated in the plane of the radius and means including rotatable and normally stationary members disposed in the plane of the radius, the stationary members being constructed for eccentrically moving the projectiles in said plane in alignment with said barrel.

3. The combination of a radially disposed gun barrel adapted to be rotated about a center in the plane of the radius and co-acting stationary and rotatable means located wholly in said plane of the barrel for eccentrically moving projectiles in said plane in alignment with said barrel from said center and discharging them into the barrel.

4. The combination of a radially disposed gun barrel adapted to be rotated in the plane of the radius and normally stationary means eccentrically engaging and moving projectiles in said plane in alignment with said barrel, and means for co-action with the first named means to provide a radial path for the moving projectiles.

5. The combination of a radially disposed rotatable gun barrel having a breech and normally stationary means engaging, moving and releasing projectiles in alignment with said barrel and discharging them into said breech, and a rotatable member co-operating with said means to radially guide the moving projectiles.

6. The combination of a radially disposed rotatable gun barrel having a breech, and means comprising co-acting stationary and rotatable parts for singly and successively engaging, moving and releasing projectiles in alignment with said barrel and discharging them into said breech.

7. The combination of a radially disposed gun barrel adapted to be rotated about a center in the plane of the radius and comprising rotatory and normally stationary parts for singly and successively moving said projectiles in said plane in alignment with said barrel from said center and discharging them into the barrel.

8. The combination of a radially disposed rotatable gun barrel and means comprising rotatory and stationary parts for receiving projectiles and eccentrically moving the same in alignment with said barrel for discharging them into the barrel.

9. The combination of a radially disposed rotatable gun barrel and means including co-acting parts completely embracing projectiles and moving the same in alignment with said barrel.

10. The combination of a radially disposed rotatable gun barrel, means embracing projectiles for eccentrically moving the same in a plane in alignment with said barrel from the center of its movement and discharging them into the barrel and means associated with said first named means for radially directing said projectiles to the barrel.

11. The combination of a radially disposed gun barrel, means comprising rotatory and stationary parts for singly and successively eccentrically moving projectiles in a plane in alignment with said barrel from the center of its movement and discharging them into the barrel.

12. The combination with rotative movable and normally immovable parts, of a gun barrel connected and rotated with one of said parts and means on the other part eccentrically acting to continuously move a projectile from the center of the first named part into the breech end of the barrel, said other part being formed with a radial way for the projectile.

13. The combination with a rotative gun barrel, of means comprising rotary and stationary parts for directing ammunition from the axis of rotation of the barrel to the breech end thereof in true alignment with the bore of the barrel and controlled by rotation of said barrel.

14. The combination with a rotative gun barrel, of means comprising rotary and stationary parts for directing ammunition from its axis of rotation radially under eccentric action to the breech end thereof in true alignment with the bore of the barrel and controlled by the speed of rotation of the latter, and assisting in progressively accelerating the velocity of the ammunition.

15. The combination with a rotative gun barrel, of means comprising rotary and stationary parts for eccentrically directing ammunition from its axis of rotation to the breech end thereof in true alignment with the bore of the barrel and controlled by the speed of rotation of the latter and assisting in progressively accelerating the velocity of the ammunition, and means for manually adjusting said means.

16. The combination with a rotative angularly adjustable gun barrel, of means comprising co-acting rotary and normally stationary parts for eccentrically moving and radially directing ammunition from its axis of rotation to the breech end thereof in true alignment with the bore of the barrel and controlled by the speed of rotation of the latter and assisting in progressively accelerating the velocity of the ammunition, means for manually adjusting said first named means, and ammunition supply means having a flexible joint to permit the angular adjustment of said barrel.

17. The combination with a rotative adjustable gun barrel, of means including co-acting parts for directing ammunition from its axis of rotation to the breech end thereof in true alignment with the bore of the barrel and controlled by the speed of rotation of the latter and assisting in progressively accelerating the velocity of the ammunition, means for manually adjusting said first named means, ammunition supply means for said first named means, and a support for the structure.

18. The combination with a rotative gun barrel and a support therefor, of means for directing ammunition from its axis of rotation to the breech end thereof in true alignment with the bore of the barrel and controlled by the speed of rotation of the latter and assisting in progressively accelerating the velocity of the ammunition, means for manually adjusting said first named means, means for supplying ammunition to the first named means from a point in a plane parallel to the plane of rotation of the barrel, and a flexible joint between said barrel and said support to permit movement of said barrel, and means for angularly adjusting the gun barrel.

19. A rotatable gun including a rotatable breech, a radial barrel rotatable therewith, a member disposed in the breech and receiving projectiles therefrom and having a radial path for discharging them into the barrel and a second member co-operating with the first named member and having an eccentric feed surface for the projectiles to continuously move the same in the radial path.

20. In a gun of the character described, a rotative barrel, eccentric means for feeding ammunition from a point in a plane parallel to the plane of movement of said barrel, and means co-acting with the eccentric means for radially directing the ammunition into the breech end of the barrel.

21. In a gun of the character described, a rotative barrel, an eccentric means co-acting with a radial means for feeding ammunition to the barrel directly into the breech end of the latter from a point in a plane parallel to its plane of movement, the path of feed of said ammunition being from the center of the gun radially in alignment with the bore of said barrel.

22. In a centrifugal gun, a rotative barrel having a projectile feeding passage which terminates coincident with the axis of the movement of the barrel, eccentric means for continuously moving ammunition from the axis of movement of said barrel into the breech end thereof when the barrel is rotated, and co-acting means associated with the eccentric means to direct the ammunition from said axis to said breech end of the barrel.

23. In a centrifugal gun, a rotative barrel having a projectile feeding passage which terminates coincident with the axis of movement of the barrel in alignment with the bore thereof, eccentric means for continuously moving ammunition from the axis of movement into the breech end of the barrel when said barrel is rotated, and a breech cup forming part of the projectile feeding passage and having a way for directing the ammunition, said means for moving the ammunition including an adjustable plate for timing the feed of the ammunition.

24. In a centrifugal gun a rotative barrel having a projectile feeding passage which terminates coincident with the axis of movement of the barrel in alignment with the bore thereof, eccentric means for moving ammunition radially from the axis of movement into the breech end of the barrel when said barrel is rotated, a breech cup forming part of the projectile feeding passage and having a radial way for the ammunition, said means for moving the ammunition including an adjustable plate for timing the feed of the ammunition, and means for admitting ammunition into the passage from a point in a plane parallel to the plane of rotation of the barrel.

25. In a centrifugal gun, a rotative barrel having a projectile feeding passage which terminates coincident with the axis of movement of the barrel in alignment with the bore thereof, eccentric means for moving ammunition from the axis of movement into the breech end of the barrel when said barrel is rotated, a breech cup forming part of the projectile feeding passage and having a radial way for the ammunition, said means for moving the ammunition including an adjustable plate for timing the feed of the ammunition, means for admitting ammunition into the passage from a point in a plane parallel to the plane of rotation of the barrel and means for adjusting the gun angularly.

26. In a centrifugal gun, a rotative barrel having a projectile feeding passage which terminates coincident with the axis of movement of the barrel in alignment with the bore thereof, eccentric means for moving ammunition from the axis of movement into the breech end of the barrel when said barrel is rotated, a breech cup forming part of the projectile feeding passage and having a radial way, said means for moving the ammunition including an adjustable plate for timing the feed of the ammunition, means for admitting ammunition into the passage and having a flexible joint, means for angularly adjusting the gun, and means for horizontlly adjusting said gun.

27. In a gun of the character described, a rotative member provided with a way for projectiles, an eccentric feed means for the projectiles adapted to co-act with said member and centrifugal force in a controlled movement of said projectiles singly and continuously from a point where the peripheral velocity is low to a point where the peripheral velocity is higher.

28. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, and means for radially directing the projectiles when under eccentric action into the breech end of the way in the rotative member.

29. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, means for radially directing the projectiles when under eccentric action into the breech end of the way in the rotative member, and means for permitting adjustment of the feed means.

30. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, means for radially directing the projectiles when under eccentric action into the breech end of the way in the rotative member, means for permitting adjustment of the feed means, and means for supplying projectiles to the directing means.

31. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, means for radially directing the projectiles when under eccentric action into the breech end of the way in the rotative member, means for permitting adjustment of the feed means, and means for supplying projectiles to the directing means from a point in a plane parallel to the plane of rotation of said rotative member.

32. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, means for radially directing the projectiles when under eccentric action into the breech end of the way in the rotative member, means for permitting adjustment of the feed means, means for supplying projectiles to the directing means from a point in a plane parallel to the plane of rotation of said rotative member, and means for angularly adjusting the rotative member.

33. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, means for radially directing the projectiles when under eccentric action into the breech end of the way in the rotative member, means for permitting adjustment of the feed means, means for supplying projectiles to the directing means from a point in a plane parallel to the plane of rotation of said rotative member, means for angularly adjusting the rotative member, and means for supporting the member for rotative movement and adjustment.

34. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, means for radially directing the projectiles when under eccentric action into the breech end of the way in the rotative member, means for permitting adjustment of the feed means, means for supplying projectiles to the directing means from a point in a plane parallel to the plane of rotation of said rotative member, means for angularly adjusting the rotative member, means for supporting the member for rotative movement and adjustment, and means for driving the rotative member.

35. In a gun of the character described, a rotative member provided with a straightway for projectiles, an eccentric feed means for the projectiles adapted to co-act with said member to move said projectiles singly and continuously from a point where the peripheral velocity is small to a point where the peripheral velocity is higher, means for radially directing the projectiles when under eccentric action into the breech end of the way in the rotative member, means for permitting adjustment of the feed means, means for supplying projectiles to the directing means from a point in a plane parallel to the plane of rotation of said rotative member, means for angularly adjusting the rotative member, means for supporting the member for rotative movement and adjustment, and means for driving the rotative member, the supply means opening into the directing means coincident with the axis of movement of said member.

36. The combination with a radially disposed rotatable gun barrel, eccentric stationary means continuously engaging and positively moving projectiles, and rotatable means co-acting therewith to radially guide the projectiles in alignment with said barrel.

37. The combination of a radially disposed gun barrel adapted to be rotated about its center in the plane of the radius, eccentric stationary means for moving the projectiles, and rotatable means co-acting with the eccentric means to guide the projectiles in alignment with said barrel from said center and discharging them into the barrel.

38. The combination of a radially disposed gun barrel adapted to be rotated in the plane of the radius, a projectile feed means therefor comprising a member disposed in alignment with said barrel rotatable therewith and a normally stationary cam member adapted to co-act with the first mentioned member to positively feed the projectiles into said barrel.

39. The combination of a radially disposed rotatable gun barrel, a projectile feed means therefor comprising a member disposed in alignment with said barrel and rotative therewith, and a normally stationary cam member adapted to co-act with the first mentioned member to singly feed the projectiles into said barrel.

40. The combination of a radially disposed gun barrel adapted to be rotated in the plane of the radius, a projectile feed means therefor comprising a member disposed in alignment with said barrel and rotatable therewith, and a normally stationary cam member adapted to co-act with the first mentioned member to positively feed the projectiles singly into said barrel.

41. The combination of a radially disposed gun barrel adapted to be rotated in the plane of the radius, a projectile feed means therefor comprising a member disposed in alignment with said barrel and rotatable therewith, and a normally stationary cam member adapted to co-act with the first mentioned member to positively feed the projectiles singly and successively into said barrel.

42. The combination of a radially disposed rotatable gun barrel, a projectile feed means comprising a member having a way communicating with the bore of said barrel and adapted to rotate therewith, and a normally stationary cam member adapted to co-act with said rotatable member to eccentrically move projectiles through said way to said barrel.

43. In a centrifugal gun, a radially disposed gun barrel adapted to be rotated to the plane of the radius, a projectile feed mechanism having a radial way communicating with the bore of said barrel and rotatable therewith, and a normally stationary cam member adapted to co-act with the rotative member to eccentrically move projectiles singly and successively in said way to partially feed the projectiles to said barrel.

44. In a centrifugal gun, rotary and stationary members, one of the members being formed with a way communicating with the bore in the barrel of the gun, the other member being formed with a feeding surface to eccentrically co-act upon the ammunition successively to singly move said ammunition through the way for the discharge of said ammunition into the bore of the barrel of the gun and the subsequent delivery thereof from the barrel under centrifugal action.

45. The combination of a radially disposed gun barrel adapted to be rotated in the plane of the radius and a projectile feed means therefor, said feed means having a member disposed in alignment with said barrel and rotatable therewith and a normally stationary cam member adapted to co-act with said rotatable member and forces created by the rotation of said barrel to feed projectiles singly and continuously into said barrel, through said barrel, and eject said projectiles out of the muzzle of said barrel in successive order.

46. The combination of a radially disposed gun barrel adapted to be rotated in the plane of the radius and a projectile feed means therefor, said feed means having a member disposed in alignment with said barrel and rotatable therewith and a normally stationary cam member adapted to co-act with said radial member to positively feed the projectiles to said barrel.

47. The combination of a movable gun barrel and means for exerting continuous eccentric action upon and directly moving spherical projectiles in alignment with said barrel.

Dated New York, N. Y., March 29, 1919.

In testimony whereof I have hereunto set my hand.

JOSEPH TREANOR McNAIER. [L. S.]